(12) United States Patent
Khojastepour et al.

(10) Patent No.: US 11,354,641 B2
(45) Date of Patent: Jun. 7, 2022

(54) TRANSPARENT WALK-THROUGH GATE

(71) Applicant: NEC Laboratories America, Inc., Princeton, NJ (US)

(72) Inventors: Mohammad Khojastepour, Lawrenceville, NY (US); Mustafa Arslan, Princeton, NJ (US); Sampath Rangarajan, Bridgewater, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/822,888

(22) Filed: Mar. 18, 2020

(65) Prior Publication Data

US 2020/0334654 A1 Oct. 22, 2020

Related U.S. Application Data

(60) Provisional application No. 62/836,126, filed on Apr. 19, 2019.

(51) Int. Cl.
*G06Q 20/20* (2012.01)
*G06K 7/10* (2006.01)

(52) U.S. Cl.
CPC ....... *G06Q 20/208* (2013.01); *G06K 7/10366* (2013.01)

(58) Field of Classification Search
CPC ... G06Q 20/208; G06Q 20/20; G06K 7/10366
See application file for complete search history.

(56) References Cited

U.S. PATENT DOCUMENTS

| | | | |
|---|---|---|---|
| 2008/0283590 A1* | 11/2008 | Oder, II | G06Q 20/20 235/380 |
| 2011/0095892 A1* | 4/2011 | Hong | A47F 9/04 340/572.7 |
| 2015/0186702 A1* | 7/2015 | Pletcher | G06K 7/10366 340/686.6 |
| 2015/0379216 A1* | 12/2015 | Liguori | G06K 7/10346 340/10.1 |
| 2018/0286185 A1* | 10/2018 | Humphrys | G07G 1/009 |
| 2018/0374180 A1* | 12/2018 | Sprogis | G06Q 20/3224 |
| 2019/0213572 A1* | 7/2019 | Imamura | G07G 1/009 |

OTHER PUBLICATIONS

Ma et al., Minding the Billions: Ultra-wideband Localization for Deployed RFID Tags, MobiCom'17, Oct. 2017, pp. 248-260.

* cited by examiner

*Primary Examiner* — A. Hunter Wilder
*Assistant Examiner* — Joseph M Mutschler
(74) *Attorney, Agent, or Firm* — Joseph Kolodka (57) ABSTRACT

A walk-through gate is provided. The walk-through gate includes a first semi-transparent side wall and a second semi-transparent side wall encapsulating a walk-through gate volume having an ingress portion and an egress portion. The walk-through gate further includes a plurality of antennas for wirelessly receiving product identifiers for wireless checkout. At least one of the plurality of antennas is made of a semi-transparent conductive material.

17 Claims, 6 Drawing Sheets

TRANSPARENT WALK-THROUGH GATE

RELATED APPLICATION INFORMATION

This application claims priority to U.S. Prov. Pat. App. Ser. No. 62/836,126, filed on Apr. 19, 2019, incorporated herein by reference herein its entirety.

BACKGROUND

Technical Field

The present invention relates to checking out and more particularly a transparent walk-through gate.

Description of the Related Art

The checkout stations in retail stores sometimes become the bottleneck in increasing revenue. This is due to several reasons. First, during the period of times that the store is visited by many customers, the queue for each of the checkout stations builds up and the store cannot process more than a given amount of customer per hour. This simply puts a cap on the possible revenue. Second, if the customer realizes that in a certain time period the checkout queues are long, they may decide to shop elsewhere instead of visiting the store of interest. Third, if the queue build up at the checkout stations happens too frequently, the customers may choose not to visit the store anymore and go to a competitor which is even more drastic by considering that the store loses a possible lifelong customer and not only a particular sale in a given time period. Fourth, the store may decide to allocate more checkout stations and attendants to reduce the average queue length at the checkout. This in turn changes the store layout and causes valuable store area specially at the front of the store to be wasted for having many number of checkout stations which may not be fully utilized in less crowded times of the day (say, in the middle of a workday) where the number of customers is less. Fifth, the store has to dedicate more cashiers for the checkout or have variable number of cashiers as a regular or stand-by to handle the checkout stations. This in turn puts an extra burden on the store management and increases the cost. Automated approaches still suffer from many of the aforementioned deficiencies. Thus, there is a need for an improved checkout.

SUMMARY

According to aspects of the present invention, a walk-through gate is provided. The walk-through gate includes a first semi-transparent side wall and a second semi-transparent side wall encapsulating a walk-through gate volume having an ingress portion and an egress portion. The walk-through gate further includes a plurality of antennas for wirelessly receiving product identifiers for wireless checkout. At least one of the plurality of antennas is made of a semi-transparent conductive material.

According to other aspects of the present invention, a method for walk-through gate checkout is provided. The method includes encapsulating, by a first semi-transparent side wall and a second semi-transparent side wall, a walk-through gate volume having an ingress portion and an egress portion. The method further includes wirelessly receiving, by a plurality of antennas, product identifiers for wireless checkout.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to a transparent walk-through gate.

By using RFID technology at the checkout stations, one can considerably speed up the checkout process by reading multiple items together (or much faster than what is possible with barcodes) in accordance with embodiments of the present invention. It is noted that "together" in this context means that the time that it takes to read multiple items are so short that from the perspective of the customer it is considered simultaneous, even though in reality the items are read one at the time and sequentially in time.

Embodiments of the present invention provide an alternative design for a walk-through gate (WTG) where most areas of the walls in the WTG are designed to be transparent. Such transparent material would guide the customer through the WTG. However, the walls of the WTG do not block the view of the other customers. Thus, a main design feature is transparent side walls for the WTG. A design is presented that takes advantage of particular transparent material that can provide precise separation between inside and outside region of WTG. Further, our physical design is essential to achieve this goal. In an embodiment, such physical design can include particular curved surfaces, using multiple such curved surfaces, using fine-grained (e.g., having a pitch in a range between 0.01 mm to 3 mm), mesh conductive material sheets, using fine grained conductive particles in a form of a cloud, using inside and outside antennas, using directional antennas at the floor where the beams are pointed upward, and so forth. The conductive mesh that is used for transparent side walls is made of such a fine grained mesh that is practically transparent. Such conductive mesh may also be used on the screens for touch sensing applications.

It is to be appreciated that the present invention can be employed in multiple types of venues including stores, theaters, stadiums, and so forth. In, for example, theaters or stadium, items that an event viewer may pick up for purchase can be checked out in a WTG in accordance with the present invention.

Figure 1:
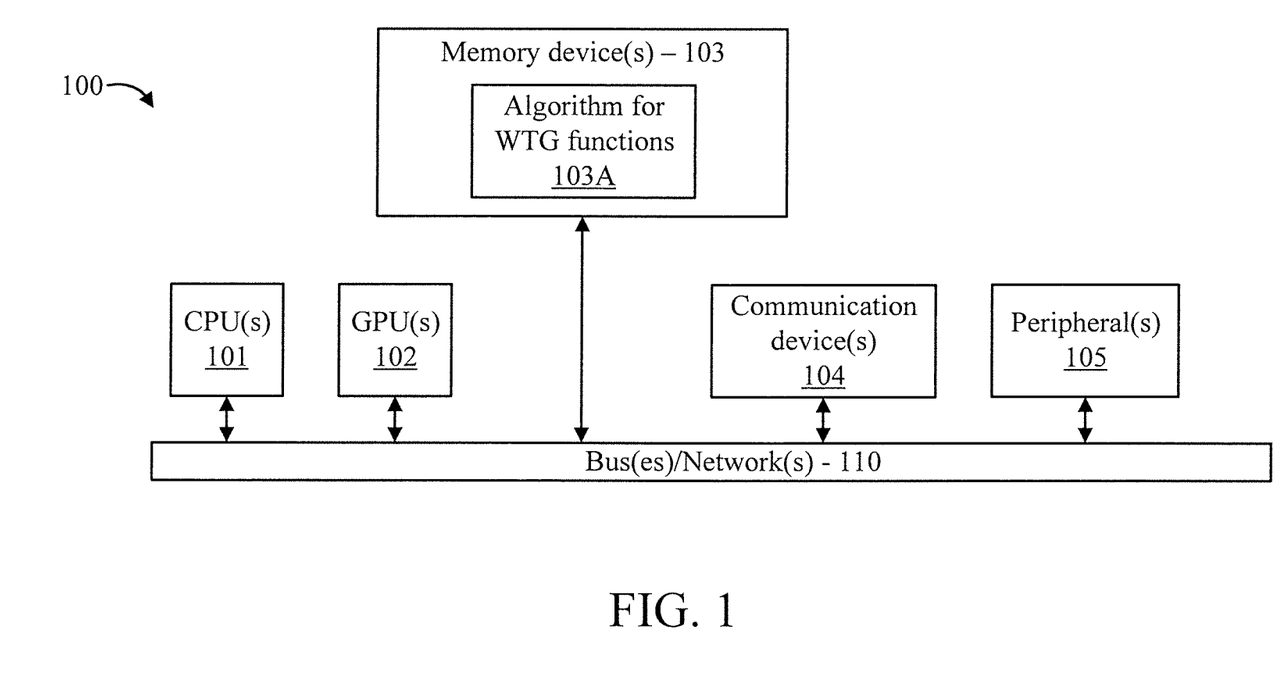
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, the memory devices 103 store a special purpose algorithm 103A for supporting transparent walk-through gate functions.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
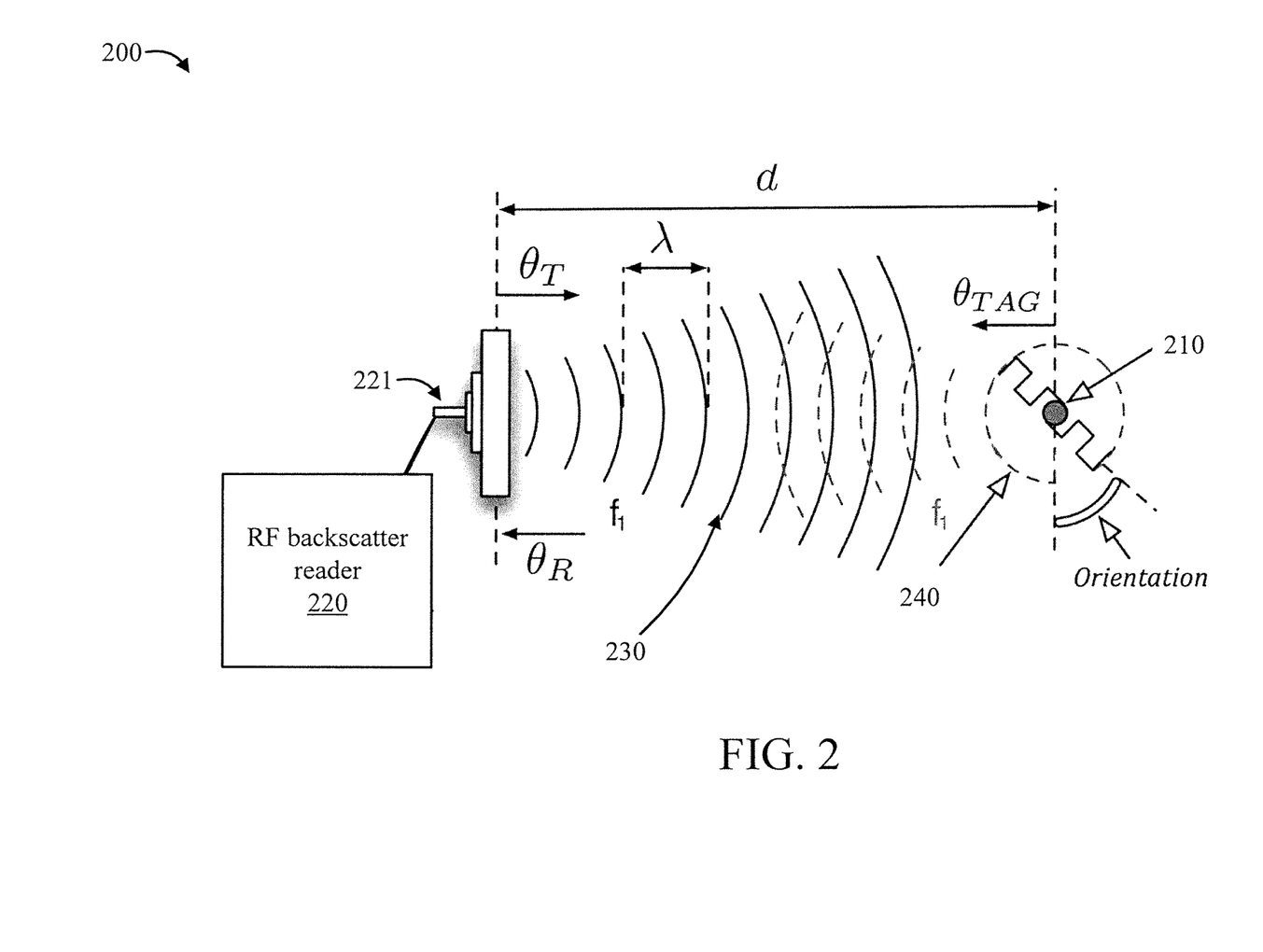
FIG. 2 is a block diagram showing an exemplary RF backscattering mechanism to which the present invention can be applied, in accordance with an embodiment of the present invention.

FIG. 2 is a block diagram showing an exemplary RF backscattering mechanism 200 to which the present invention can be applied, in accordance with an embodiment of the present invention.

The backscattering mechanism 200 involves a passive RF tag 210 and an RF reader 220 with an RF antenna 221. One or more of the preceding elements can be communication devices and/or peripherals of processing system 100 of FIG. 1. While one exemplary tag is shown for the sake of illustration, the present invention is intended to be employed in an environment having many tags, where conventional approaches would suffer the aforementioned deficiencies overcome by embodiments of the present invention described herein with respect to reading the tags in such an environment.

In FIG. 2, d denotes a distance between the RF antenna 221 to the RF tag 210, λ denotes a wavelength of the transmitted wave 230, $\theta_T$ denotes the phase of the transmit signal, $\theta_R$ denotes the phase of the backscattered received signal, and $f_1$ denotes a frequency of the transmitted wave 230 and also of the backscatter wave 240.

In operation, a Radio Frequency (RF) wave 230 is transmitted from the antenna 221 of the RF reader 220. Depending upon an orientation of the RF tag 210, the RF wave 230 reflects the RF wave 230 back to the RF antenna 221 as a backscatter wave 240. Moreover, by modulating the state of the reflected signal, i.e., the backscatter wave 240, the passive RF tag 210 is able to convey information stored in the passive RF tag 210.

Figure 3:
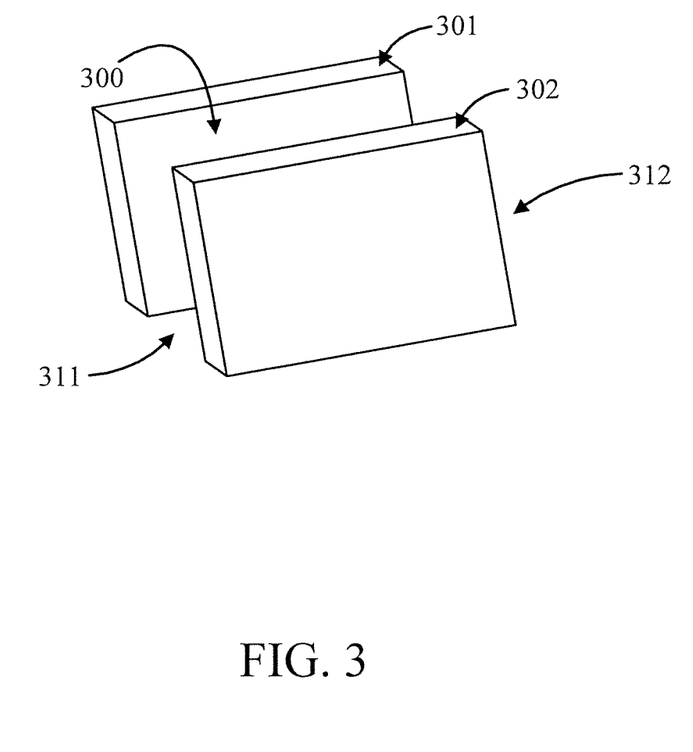
FIG. 3 is a diagram showing an exemplary inside area of a WTG, in accordance with an embodiment of the present invention.

FIG. 3 is a diagram showing an exemplary inside area 300 of a WTG, in accordance with an embodiment of the present invention. The inside area 300 is the volume between the two side walls 301 and 302 of the WTG and it may also include a bigger volume directly above the gate and slightly outside the gate entrance 311 and the gate exit 312.

Figure 4:
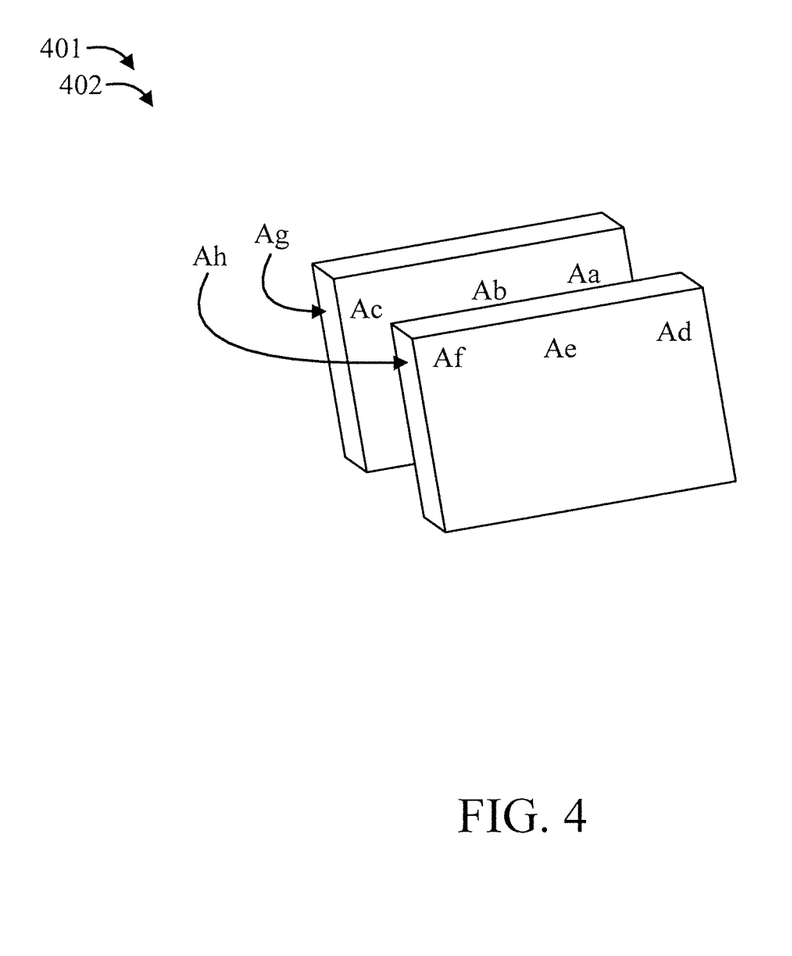
FIG. 4 is a diagram showing exemplary inside antennas and outside antennas that are placed on the WTG walls, in accordance with an embodiment of the present invention.

FIG. 4 is a diagram showing exemplary inside antennas 401 and outside antennas 402 that are placed on the WTG walls, in accordance with an embodiment of the present invention.

Such inside antennas 401 and outside antennas 402 may be made of transparent conductive mesh in order to make the antennas transparent. In the exemplary embodiment of FIG. 4, eight antennas as used. However, it is to be appreciated that other numbers of antennas can be used in other embodiments, depending upon the implementation. In FIG. 4, the antennas are designated by the figure reference numerals Aa through Ah. Aa through Af are inside antennas 401, while Ag and Ah are outside antennas 402.

A description will now be given regarding a physical structure of the present invention, in accordance with an embodiment of the present invention.

A smart checkout station is called a walk-though gate (WTG) where it is designed to have two side walls and the volume between the side walls is considered to be inside the WTG. The inside area of WTG may also be defined as a connected volume that is larger than the volume between the two side walls and that completely encompasses that volume. For example, the volume above the height of the side walls but between the side walls may be considered inside. Any area that is not inside a WTG is considered outside. Please note that there might be multiple WTGs deployed in close proximity that can even have adjacent walls.

In an embodiment, operation is exemplified as follows: The customer enters the inside area of WTG and possibly pauses for a moment until a signal from the system informs the customer that he can exit the WTG. Exiting the WTG means leaving the inside area of WTG and going outside. Please note that in an example scenario the customer is only allowed to enter from one side and exit from the other side. The duration in which the customer remains inside the WTG is called a session and the time that is spent in a session is referred to as session duration.

We call the area outside the WTG and adjacent to the WTG walls as the sides of WTG (for the left side and right side). The area that is used as an entrance to the WTG as the front (or ingress portion) and the area close to the exit of the WTG as the back (or egress portion) of WTG. The transparent WTG is a WTG which has fully transparent or partially non-transparent walls.

A description will now be given regarding wall composition, in accordance with an embodiment of the present invention.

In order to have a transparent wall, we may use glass, resin, polycarbonate, plastic or other types of transparent material that are sturdy and shatter resistant. Using one or a combination of (1) fine-grained conductive mesh and (2) an infusion of tiny conductive particles such as carbon particles (e.g., graphite powders), copper, or tin (or other conductive material) into the wall is used to make the side walls considerably attenuate the RF signals that pass from one side to the other. One possibility is to employ a fine-grained mesh that is attached to the side wall of the WTG that is, for example, made of polycarbonate material. Multiple such walls with a proper distance between them, e.g., 3 cm-10 cm may be placed in each side of the WTG. The purpose of a multi-layer side wall is to further trap the RF signal and attenuate the RF signal that passes from one side to another. We note that the RF signal here means the RF signal in the frequency band in which the RFID devices are operating. The size of the mesh and material that the mesh is made of has to be properly chosen in order to achieve the desired attenuation.

Another possibility is to infuse the plastic or glass into the conductive mesh in which case the mesh will be buried inside the material, e.g., glass or plastic (say polycarbonate). In a more advanced design, small conductive particles form a cloud in the entire material that is used to make the side wall of the WTG. Such material, say tiny copper or carbon particle, or carbon fiber (or other conductive material) can collectively generate an RF absorbing material throughout the whole thickness of the side wall that is made of this material. Hence, they provide more attenuation and considerably less reflection. On the other hand, the conductive mesh generates considerable reflection and less absorption. Although from the perspective of having attenuation from one side of the wall to the other both techniques are quite effective, depending on the use case one may employ one or the other, or even a combination of both in order to reach a desired level of attenuation as well as reflection in either direction.

More specifically, one may use two layers of mesh, one close to the internal surface of the wall and another close to the external surface of the wall in order to provide reflection in either direction In addition, the space between these two conductive mesh may be filled with a material such as polycarbonate or resin that is doped with tiny conductive particles or carbon fibers. The use of carbon fiber also enhances the durability and increases the strength of the material in building the side walls.

A description will now be given regarding a wall physical design, in accordance with an embodiment of the present invention.

The physical design of the wall depends on numerous factors.

First, we need to provide isolation between the inside and outside region of the WTG. Using a curved surface for the side walls can contain most of the RF signals from the internal antennas in the internal region of WTG and have small spill over to the outside region of the WTG. Such curvature can also allow less RF signals from the outside antennas to be leaked to the inside region of WTG.

Figure 5:
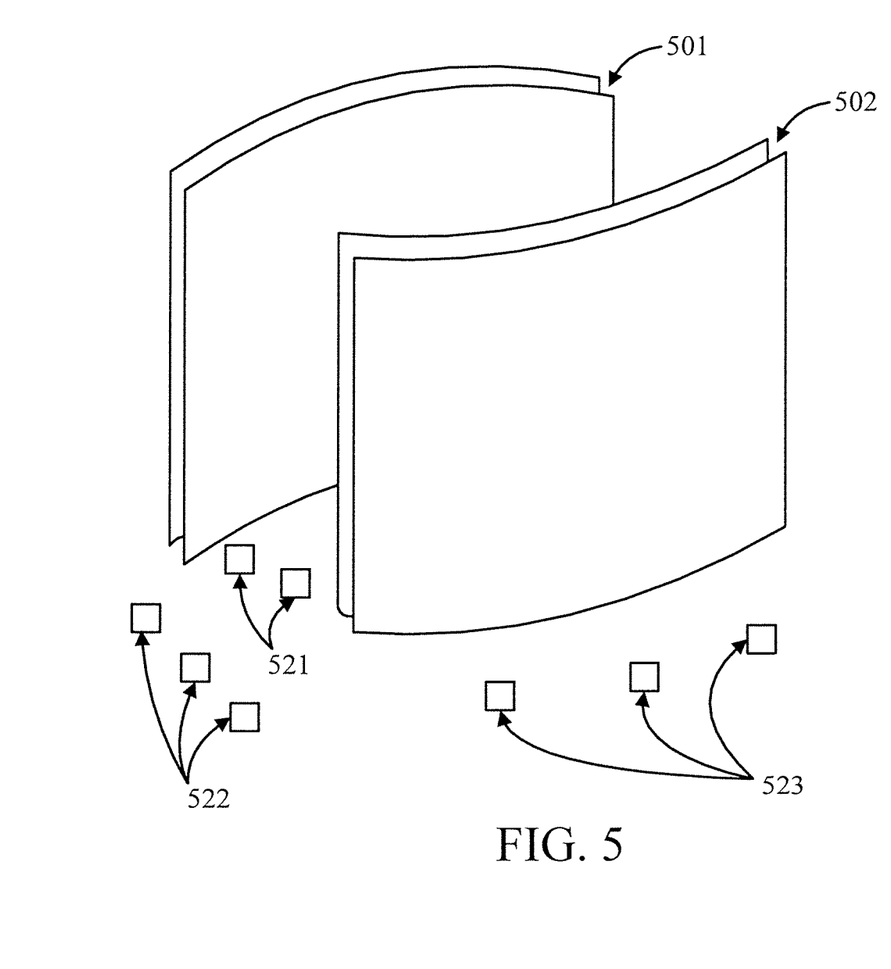
FIG. 5 is a diagram showing two curved transparent walls as each of the left and right side walls of a WTG, in accordance with an embodiment of the present invention.

Second, to increase the isolation, it is possible to have multiple curved surfaces on each side wall, e.g., when all the curvatures are identical and they are separated with a fixed distance from each other. FIG. 5 is a diagram showing two curved transparent walls 501 and 502 as each of the left and right side walls of a WTG, in accordance with an embodiment of the present invention. FIG. 5 also shows a possible arrangement of antennas 521 on the ground for covering the inside region, antennas 522 on the outside region at the entrance (or exit), and antennas 523 on the outside region on the side of the WTG. Such antennas may also be placed on the ceiling as well.

Third, since the walls are supposed to be transparent or mostly transparent with partial blockage, placement of the actual antennas on the side wall should be limited. To this end, a design is proposed to allow the antennas to be placed on the ground and under the passageway of the WTG for the inside antennas. For the same reason, the antennas for the side (the outward side antennas) may be placed on the ground or inside a hole in the ground. These antennas that are placed on the ground will be pointed up, which means that their transmission pattern is unilateral and upward (towards the ceiling). A patch antenna is a good candidate for such a design.

Fourth, if no opaque material is used on the side walls, i.e., the walls are fully transparent, the outside antennas at the entrance and at the exit may be placed again on the ground or inside a hole on the ground and be covered by carpet, wooden tiles, or any other (non-conductive) material that does not affect the RF signals that pass through.

Fifth, the edges of the side walls close to the entrance, and/or close to the exit, and/or even on the top may be covered by some opaque material such as metal. In that case, it is possible to place an antenna both inside and outside with respect to such opaque surfaces.

Sixth, in order to avoid unwanted leakage from the antennas, each antenna and, in particular, the antenna in the ground, may be placed inside a shell casing that is made of RF absorbing material where only the face of the antenna (e.g., the transmitting face of the patch antenna) is not covered.

Seventh, in order to further isolate the inside and outside region of WTG with respect to the RF signals, it is possible to have a movable transparent divider that could extend from the top of the side walls during the session. The same idea of a movable divider may be used at the entrance and exit, e.g., as multiple sliding panels or doors. The movable divider may be composed of similar materials used for the side walls, i.e., cloud particles or conductive meshes, and so forth.

A description will now be given regarding side antennas on the side wall, in accordance with an embodiment of the present invention.

As mentioned, the main goal of the design is to have side walls that are mostly transparent, which means that only small areas will be visually blocked. Hence, it is still possible to place antennas on the side walls for the inside antennas facing toward the inside region of WTG and for the outside side antennas that are facing toward the outside region of WTG. The size of a patch antenna in the frequency range of the RFID is usually around 10-15 cm (in the form of a square). Here, two improvements are possible. One is to design antennas that are made of transparent meshes and the feed line are made of micro strips having a line width between 1 mm to 4 mm. Even using opaque material for the micro strips and/or the transmitting surface of the antenna would be possible without blocking too much of the view. The design can even be used to generate a desired aesthetic effect which can even improve the plain look of the WTG side walls. Another improvement is to use meta-material in the design of the antenna. With such material, the size of the antenna may be considerably reduced (e.g., by about an order of magnitude).

A description will now be given regarding antenna movement, in accordance with an embodiment of the present invention.

Yet another improvement to the design of the transparent WTG is to have antenna elements that are movable. This movement not only provides perturbation in the transmitted RF field that is necessary and important for providing coverage in the near- and mid-field of the antennas, but also provides a means to track the movement of the RFIDs that are affixed to the items, and better scan the RFIDs of the products. This could be in the form of a flapping mechanism for the antennas that generates rotations on the antennas, e.g., as a back and forth movement, or it can generate mall movement by shaking the antennas. Another possibility is to have an antenna that moves from one end of the side wall to the other end along the curvature of the side wall. Such movement only generates blockage of the view in a small area and for a short time as it moves from one end to the other. It is also possible to use either type of moving antennas as the floor antennas as well. Again, such antennas should be covered by materials that do not block RF signals. We note that the idea of antenna movement may be used in other form of a WTG. However, the movement in the WTG with transparent walls is more important from a specific point of view which is to minimize blocking the possible view of other customers.

A description will now be given regarding ceiling antennas, in accordance with an embodiment of the present invention.

Since the inside antennas that are placed under the floor may read the tags that are higher than the side walls and are outside WTG where the RF signal is not blocked, it is envisioned to place antennas on the ceiling to alleviate this problem. In the processing algorithm of the WTG, the readings from all antennas can be used to judge if the tag is inside or outside. Such ceiling antennas would normally be placed in front and back areas of the WTG and away from the WTG.

A description will now be given regarding prior knowledge, in accordance with an embodiment of the present invention.

Hereinafter, we discuss an algorithmic improvement to the design of WTG which is particularly important in the design of a transparent WTG. The collection of antennas whether inside or outside antennas are labeled, and depending on their position they play a different role in the decision making algorithm that judges if a RFID tag is within the inside region or outside region of WTG. These antennas may have different weights associated with them which could be a function of many parameters including received signal strength from that antenna. Each reading provides a likelihood for a tag to be in a certain position. This likelihood is a function of the specific antenna (e.g., whether inside or outside, and where it is placed) as well as the parameters such as received signal strength (RSSI), phase shift, or Doppler. This likelihood in general can be a function of time as well, which means it might consider multiple samples together where such samples may be from the same or different antennas and provide a joint likelihood function. This may include a case that reading from some joint antennas have higher weight than similar readings from another set of antennas. In a judgment algorithm, a metric computation is performed using the readings to judge if the tag is inside or outside.

The algorithm may be further improved, when prior knowledge is available. For example, when a clustering or grouping technique is used prior to entering the WTG by means of the outside antennas that are placed on the floor, on the ceiling and at the entrance side of the WTG, one can combine a prior knowledge about the items in the decision making process. Such prior knowledge could be in the form of proximity factor such as a distance measure or embedding distance measure (e.g., by using neural networks) between the items or between an item and a reference tag. A reference tag may be used on the shopping cart or shopping bag that is carried by the customer. Alternatively, the reference tag might be in the form of a membership card or embedded within the membership card that is carried by the customer. Such proximity factor may in turn be translated to a likelihood ratio which is easily possible to be combined with the metric computation that is performed by the judgment algorithm.

A description will now be given regarding delayed billing, in accordance with an embodiment of the present invention.

The algorithm may be further improved if we consider time series of the readings for example when the readings start from the antennas that are at the entrance (ingress portion) and then transition to the antennas that are in the middle (i.e., the inside antennas of WTG) and then to the antennas at the exit (egress portion). Using this temporal information, one may deduce the transition of the items from one end to the other. If there is only a single session during this time period, such information may be used to adjust the judgment algorithm accordingly. Such algorithm would then require the possibility of late billing. This is due to the fact that any prior knowledge that is acquired by a time-series analysis algorithm can potentially be used along with the metric computation algorithm while one is in session. However, the accuracy of such time-series analysis may reach a pre-set value after the judgment is performed. In this case, the time-series algorithm may be useful to be combined with the judgment algorithm only if late billing is possible. This means that if the algorithm later decides that an item belongs to this session (i.e., the item is inside WTG even though it was judged to be outside by the conclusion of the session) it will be added to the related cart or bag of the user at a later time and will be billed accordingly. Similarly, any items that should have not been assigned to this session may be adjusted accordingly.

Figure 6:
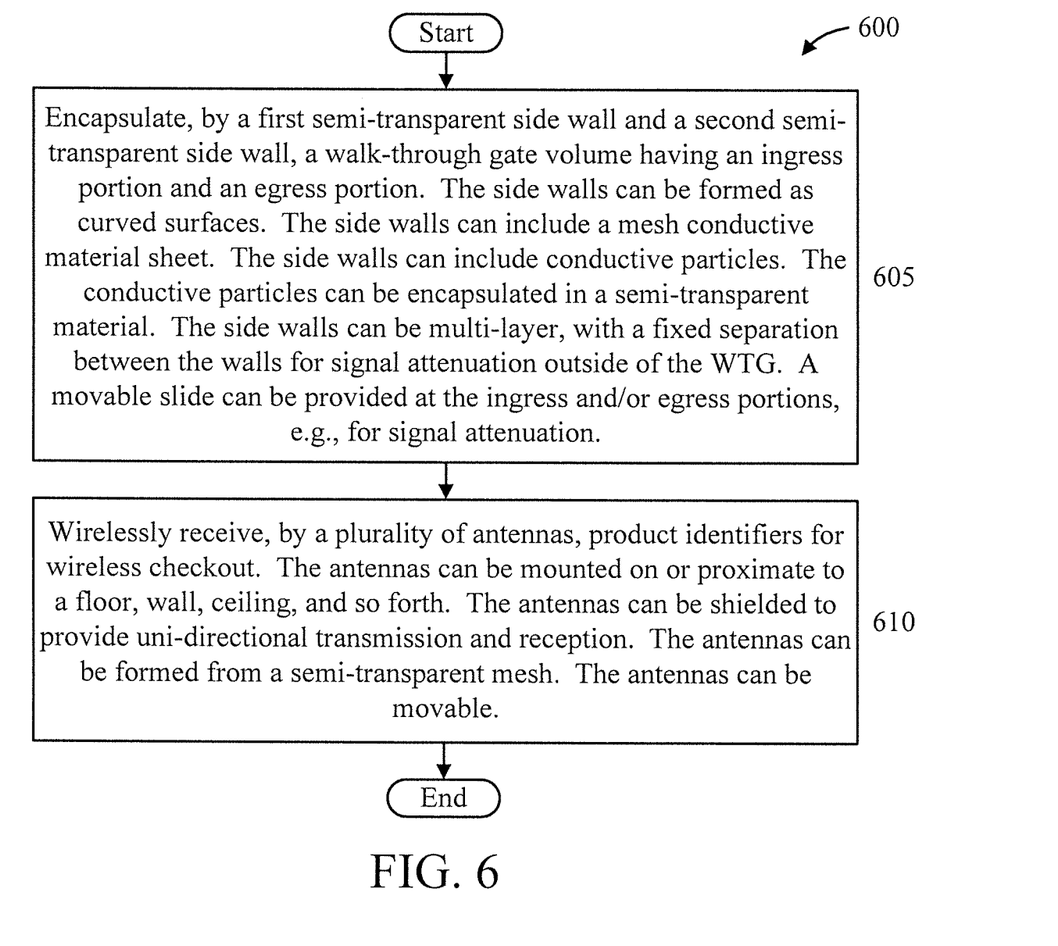
FIG. 6 is a flow diagram showing an exemplary 600 for walk-through gate checkout, in accordance with an embodiment of the present invention.

FIG. 6 is a flow diagram showing an exemplary method 600 for walk-through gate checkout, in accordance with an embodiment of the present invention.

At block 605, encapsulate, by a first semi-transparent side wall and a second semi-transparent side wall, a walk-through gate volume having an ingress portion and an egress portion. The side walls can be formed as curved surfaces. The side walls can include a mesh conductive material sheet. The side walls can include conductive particles. The conductive particles can be encapsulated in a semi-transparent material. The side walls can be multi-layer, with a fixed separation between the walls for signal attenuation outside of the WTG. A movable slide can be provided at the ingress and/or egress portions, e.g., for signal attenuation.

At block 610, wirelessly receive, by a plurality of antennas, product identifiers for wireless checkout. The antennas can be mounted on or proximate to a floor, wall, ceiling, and so forth. The antennas can be shielded to provide unidirectional transmission and reception. The antennas can be formed from a semi-transparent mesh. The antennas can be movable.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:
1. A walk-through gate, comprising:
   a first semi-transparent side wall and a second semi-transparent side wall encapsulating a walk-through gate volume having an ingress portion and an egress portion;
   a plurality of antennas for wirelessly receiving and distinguishing from among different purchasable product identifiers for product specific wireless product purchase; and judging, for a given product purchase session, whether any items should have been included in the given product purchase session and whether any items should have been excluded in the given product purchase session, and providing a late charge or a late credit to a final bill for an ending of the given product purchase session responsive to a given judgement for the given product purchase session, wherein the plurality of antennas comprises a movable antenna configured to read the product identifiers, and wherein at least one of the first semi-transparent side wall and the second semi-transparent side wall comprises the movable antenna, wherein the movable antennas moves within comprising ones of the first transparent side wall and the second semi-transparent side wall.

2. The walk-through gate of claim 1, wherein each of the first and second semi-transparent side walls provides at least a partially unobstructed view there through.

3. The walk-through gate of claim 1, wherein a material used to form the first and second semi-transparent side walls provides an RF signal blocking function between inside and outside regions of the walk-through gate.

4. The walk-through gate of claim 1, wherein at least one of the first and second semi-transparent side walls is formed as a curved surface.

5. The walk-through gate of claim 1, wherein at least one of the first and second semi-transparent side walls comprises at least one mesh conductive material sheet.

6. The walk-through gate of claim 1, wherein at least one of the first and second semi-transparent walls comprise conductive particles.

7. The walk-through gate of claim 6, wherein the conductive particles are encapsulated in a material that is at least semi-transparent.

8. The walk-through gate of claim 1, wherein the plurality of antennas comprise inside volume antennas dispersed in the walk-through gate volume.

9. The walk-through gate of claim 1, wherein the plurality of antennas are planar patch antennas and are mounted to lack a parallel plane between at least two of the plurality of planar patch antennas.

10. The walk-through gate of claim 1, wherein the plurality of antennas comprise directional antennas mounted on or proximate to a floor.

11. The walk-through gate of claim 1, wherein the plurality of antennas comprise directional antennas mounted on or proximate to a ceiling.

12. The walk-through gate of claim 1, wherein the plurality of antennas comprise directional antennas mounted on at least one of the first and second semi-transparent side walls at a height at least one of below and above an expected eye level range.

13. The walk-through gate of claim 1, wherein at least one of the plurality of antennas is formed as a conductive mesh.

14. The walk-through gate of claim 1, wherein the movable antenna is mounted on or proximate to a floor.

15. The walk-through gate of claim 1, wherein the walk-through gate is arranged as one of a plurality of walk-through gates positioned in a wall-to-wall adjacent configuration having a predetermined wall-to-wall separation for signal attenuation outside of the walk-through gate volume of a used one of the plurality of walk-through gates.

16. The walk-through gate of claim 1, wherein at least one of the plurality of antennas is made of a semi-transparent conductive material.

17. A method for walk-through gate checkout, comprising:

encapsulating, by a first semi-transparent side wall and a second semi-transparent side wall, a walk-through gate volume having an ingress portion and an egress portion;

wirelessly receiving and distinguishing from among, by a plurality of antennas, different purchasable product identifiers for product specific wireless product purchase; and judging, for a given product purchase session, whether any items should have been included in the given product purchase session and whether any items should have been excluded in the given product purchase session, and providing a late charge or a late credit to a final bill for an ending of the given product purchase session responsive to a given judgement for the given product purchase session, wherein the plurality of antennas comprises a movable antenna configured to read the product identifiers, and wherein at least one of the first semi-transparent side wall and the second semi-transparent side wall comprises the movable antenna, wherein the movable antennas moves within comprising ones of the first transparent side wall and the second semi-transparent side wall.

* * * * *